United States Patent [19]
Fushimi et al.

[11] Patent Number: 5,648,417
[45] Date of Patent: Jul. 15, 1997

[54] COLOR COATING COMPOSITION

[75] Inventors: Akira Fushimi, Ikoma; Seigo Miyazoe, Takatsuki; Atsushi Yamada, Yawata; Yoshitaka Okude, Hirakata, all of Japan

[73] Assignee: Nippon Paint Co., Ltd., Osaka, Japan

[21] Appl. No.: 495,545

[22] PCT Filed: Dec. 1, 1994

[86] PCT No.: PCT/JP94/02026

§ 371 Date: Jul. 29, 1995

§ 102(e) Date: Jul. 29, 1995

[87] PCT Pub. No.: WO95/15362

PCT Pub. Date: Jun. 8, 1995

[30] Foreign Application Priority Data

Dec. 3, 1993 [JP] Japan ................................ 5-303849
Dec. 28, 1993 [JP] Japan ................................ 5-335044

[51] Int. Cl.$^6$ ................ C09D 167/00; C09D 133/14; C08K 5/19; C08K 5/57
[52] U.S. Cl. ................ 524/513; 524/178; 524/512; 523/408; 523/410; 523/523; 525/166; 525/176; 525/441

[58] Field of Search ................ 524/178, 512, 524/513; 523/523, 410, 408; 525/166, 176, 447; 427/410, 419.8

[56] References Cited

U.S. PATENT DOCUMENTS 4,339,365 7/1982 Becher et al. ................ 524/513
4,461,870 7/1984 Kanda et al. ................ 524/513

FOREIGN PATENT DOCUMENTS 2252558 8/1992 United Kingdom .
9118954 12/1991 WIPO .

Primary Examiner—Andrew E. C. Merriam
Attorney, Agent, or Firm—Townsend & Banta

[57] ABSTRACT

A color coating composition having excellent appearance, acid resistance and mar resistance is provided. Such excellent properties are achieved by the combination of an aminoplast-curing coating system with a curable coating system comprising a particular half esterified acid anhydrides, hydroxyl groups and epoxy groups.

30 Claims, No Drawings

COLOR COATING COMPOSITION

FIELD OF THE INVENTION

The present invention relates to a color coating composition having excellent mar resistance, acid resistance and superior appearance which is useful in top coats for automobiles as well as coil coatings.

PRIOR ART

Solid color coating compositions employing aminoplast as a curing agent are well known. However, when the aminoplast is employed as a sole curing agent, acid resistance of the coating film is poor at the site of the crosslinking, resulting in a coating film defect especially due to acid rain which is one of recent concern.

We have already proposed a curable resin composition which comprises (a) a polymer containing acid anhydride half ester groups and (b) a polymer having hydroxyl groups and epoxy groups. Since this coating composition employs an acid anhydride curing system, excellent acid resistance is achieved and the coating film defect due to the acid rain can be significantly improved. Nevertheless, this coating system is intended to be used basically as a clear coating, and no studies have been made with regard to a solid color coating composition containing pigments.

It is desired that a coating film obtained from a solid color coating composition has not only acid resistance mentioned above, but also superior appearance performance and excellent mar resistance. In addition, a coating composition should also be a high content of nonvolatile components. On the other hand, it is essential that the coating film has high crosslink density to achieve both of excellent acid resistance and excellent mar resistance. As a result, strain at the curing by baking is accumulated in the interface of the coating, resulting in the problem of reduced adhesion to an undercoat.

SUMMARY OF THE INVENTION

The present invention provides a solid color coating composition which provides a coating film having excellent mar resistance, excellent acid resistance, excellent adhesion to an undercoat and superior appearance which are achieved by incorporating a pigment dispersed in a particular pigment dispersing resin and a particular resin in particular amounts to the clear coating system already suggested by us.

Accordingly, the present invention provides a color coating composition which comprises:

(1) 10 to 60% by weight of one or more pigment dispersing resins selected from the group consisting of a polyester resin and derivatives thereof which are modified with a basic substance, wherein said resin has an acid value from 5 to 300 mgKOH/g(solid), a hydroxyl value from 5 to 300 mgKOH/g(solid), a number average molecular weight from 400 to 6,000, said polyester resin is prepared from acid component and alcohol component and said acid component contains not more than 25% by weight of an acid having a straight carbon chain with 12 or more carbon atoms based on the total monomer weight of the polyester resin;

(2) 1 to 40% by weight of an aminoplast;

(3) 5 to 60% by weight of a polymer having carboxyl groups and carboxylic ester groups, which is obtained by reacting (i) an acid anhydride-containing polymer obtained by copolymerizing (a) 15 to 40% by weight of an acid anhydride-containing ethylenically unsaturated monomer with (b) 60 to 85% by weight of other copolymerizable ethylenically unsaturated monomer, with (ii) a hydroxyl group-containing compound having 1 to 12 carbon atoms in the molar ratio of the acid anhydride/the hydroxyl group of 1/10 to 1/1;

(4) 5 to 60% by weight of a polymer having hydroxyl groups and epoxy groups obtained by copolymerizing (i) 5 to 70% by weight of a hydroxyl group-containing ethylenically unsaturated monomer having the structure of the formula (i):

wherein R represents hydrogen or methyl group, X represents

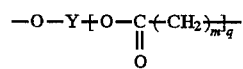

(Y is a straight or branched alkylene group having 2 to 8 carbon atoms, m is an integer from 3 to 7, and q is an integer from 0 to 4) or

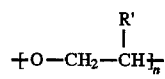

(R' represents hydrogen or methyl group and n is an integer of 2 to 50), (ii) 10 to 60% by weight of an epoxy group-containing ethylenically unsaturated monomer, and optionally (iii) 0 to 85% by weight of other copolymerizable ethylenically unsaturated monomer, and, (5) a pigment, wherein the contents of the components (1) to (4) are based on the resin solid component in the composition, while the contents of the monomers in the components (3) and (4) are based on the total monomers of the respective components.

For the purpose of enhancing mar resistance and high content of nonvolatile components, the coating composition mentioned above may further contain any of or both of (6) an acrylic resin having hydroxyl groups and carboxyl groups and (7) a silicone polymer of a particular structure having both of hydroxyl groups and carboxyl groups.

Component (1)

The polyester resin employed in the present invention is produced by an ordinary condensation reaction of an acid (including an acid anhydride) and a polyhydric alcohol. The acids to be employed are, for example, dibasic acids (such as phthalic acid, isophthalic acid, terephthalic acid, succinic acid, adipic acid, azelaic acid, sebacic acid, tetrahydrophthalic acid, hexahydrophthalic acid, maleic acid and fumaric acid), acid anhydrides (such as succinic anhydride, phthalic anhydride, tetrahydrophthalic anhydride, hexahydrophthalic anhydride, himic anhydride, trimellitic anhydride, methylcyclohexene tricarboxylic anhydride, pyromellitic anhydride) and the like. For preparation of the polyester resin, the acids generally are polybasic acid, especially dibasic acid, but monobasic acid (such as, 2-ethylhexanoic acid, benzoic acid, p-t-butylbenzoic acid, soybean fatty acid, coconut fatty acid and the like) may also be employed as the acid. If necessary, the polyester resin may be modified by fatty oil, such as castor oil, palm oil, linseed oil, palm kernel oil; safflower oil, soybean oil, paulownia oil, tall oil, dehydrated castor oil. In the present invention, it should be noted that the polyester resin is prepared from acid component and alcohol component, but the acid component contains not more than 25% by weight of an acid having a straight carbon chain with 12 or more carbon atoms, preferably 1 to 20% by weight, more preferably 1 to 15% by weight, based on the total monomer weight of the polyester resin. The acid component having a straight carbon chain with 12 or more carbon atoms may be derived from monobasic acid and fatty oil. When an acid having a straight carbon chain with 12 or more carbon atoms is present in an amount of more than 25% by weight in the acid component, adhesion power to the under coat is poor.

Examples of the polyhydric alcohol to be employed are ethylene glycol, propylene glycol, 1,3-butylene glycol, 1,6-hexane diol, diethylene glycol, dipropylene glycol, neopentyl glycol, triethylene glycol, hydrogenated bisphenol A, phenol dihydroxypropyl ether, glycerin, trimethylol ethane, tri-methylol propane, pentaerythritol, dipentaerythritol and the like. Some of epoxy compounds, such as Cardura E-10 (available from Shell Chemical Co.) may also be used as the polyhydric alcohol.

The polyester resin employed may be synthesized by an ordinary esterification. Thus, dehydration condensation reaction between a hydroxyl group and a carboxyl group or esterification between a hydroxyl group and an acid anhydride followed by dehydration with an alkyl component are conducted to effect polyesterification, whereby obtaining a resulting polymer.

The the polyester resin produced have an acid value from 5 to 300 mgKOH/g(solid), a hydroxyl value from 5 to 300 mg/KOH/g(solid) and a number average molecular weight from 400 to 6,000. The hydroxyl groups present in the polyester resin mentioned above may be subjected to chain extension using lactones for the purpose of making the resin more soft. Preferable chain extending lactones are γ-butylolactone, ε-caprolactone and the like.

The polyester resin mentioned above may be modified, as described in Japanese Kokai Publication Sho59(1984)-138269, using a basic substance such as aminoplast or hydroxyethyl ethylene- imine (such as HEA from Sogo Yakko Co., Ltd.), 2-hydroxypropyl-2- aziridinyl ethyl carboxylate (such as HPAC from Sogo Yakko Co., Ltd.) for the purpose of improvement of dispersibility of pigments. The amount of the modifier is preferably 1 to 10% by weight based on the weight of the resin. An amount less than 1% by weight results in insufficient effect of modification, while an amount exceeding 10% by weight affects the stability of the resin.

Component (2)

The aminoplast employed in the present invention may be any of those used conventionally in coatings, such as melamine, benzoguanamine, hydrogenated benzoguanamine and urea which is modified with formaldehyde and alcohol. Preferable curing agent is a modified melamine which is obtained by reacting a melamine compound with formaldehyde to form an adduct of which methylol group is partially or completely etherified with a lower primary alcohol (e.g. methanol, butanol and the like).

Component (3)

The polymer (3) having carboxyl groups and carboxylic acid ester groups employed in the coating composition according to the present invention is a half ester-containing polymer obtained by reacting an acid anhydride group-containing polymer (3)(i) and a hydroxyl group-containing composition (3)(ii).

The acid anhydride group-containing polymer (3)(i) is obtained by copolymerizing an acid anhydride group-containing ethylenically unsaturated monomer (3)(i)(a) in an amount from 15 to 40% by weight, preferably from 15 to 30% by weight, with other copolymerizable ethylenically unsaturated monomer (3)(i)(b) in an amount from 60 to 85% by weight, preferably from 70 to 85% by weight. The acid anhydride group-containing ethylenically unsaturated monomer (3)(i)(a) in an amount less than 15% by weight results in insufficient curability, while that in an amount exceeding 40% by weight results in a coating film formed which is rigid and too brittle and thus has a poor weathering resistance.

Examples of the acid anhydride group-containing ethylenically unsaturated monomer (3)(i)(a) are itaconic anhydride, maleic anhydride, citraconic anhydride and the like. Other copolymerizable ethylenically unsaturated monomer (3)(i)(b) may be any of those not affecting the acid anhydride group, and preferably monomers which have single ethylenically unsaturated bond and 3 to 15, preferably 4 to 12 carbon atoms.

The mixtures of two or more ethylenically unsaturated monomers may also be employed as the other copolymerizable ethylenically unsaturated monomer (3)(i)(b) because they may be useful to increase the compatibility between the other resins. Such monomers which are preferably employed are styrene, styrene derivatives (such as, alpha-methylstyrene, p-t-butylstyrene), (meth)acrylic esters (such as, methyl (meth)acrylate, ethyl (meth)acrylate, propyl (meth)acrylate, n-, i- and t-butyl (meth)acrylate, 2-ethylhexyl (meth)acrylate, lauryl (meth)acrylate, cyclohexyl (meth)acrylate, isobornyl (meth)acrylate etc.), VeoVa-9 and VeoVa-10 both produced by Shell Chemical Company and the like. The monomers having carboxyl groups such as acrylic acid and methacrylic acid may also be employed. When the styrene and styrene derivatives are employed as the other copolymerizable monomer, the amount is preferably 5 to 40% by weight. Amounts of more than 40% by weight reduce weather resistance.

The copolymerization may be conducted by any of known methods, such as radical polymerization in solution, for example, at a polymerization temperature from 100° to 150° C. for a polymerization period from 3 to 8 hours. Azo initiators or peroxide initiators are preferably employed as initiators. Other additives, such as chain transfer agent, may also be employed. The number average molecular weight of a polymer obtained is from 1,500 to 8,000, preferably from 2,000 to 5,000. A number average molecular weight exceeding 8,000 may cause reduced compatibility between the resins, resulting in poor appearance of the coating film. A number average molecular weight less than 1,500 results in insufficient curability of the coating composition. The polymer obtained has average 2 or more, preferably 2 to 15 acid anhydride groups in one molecule. The acid anhydride groups less than 2 in one molecule may cause insufficient curability of the coating composition, while that exceeding 15 causes too rigid and too brittle coating film, resulting in insufficient weathering resistance.

Subsequently, the polymer obtained is reacted with the hydroxyl group-containing compound (3)(ii) in a molar ratio of the acid anhydride groups/the hydroxyl groups from 1/10 to 1/1, preferably 1/5 to 1/1.2 to yield the polymer (3) having carboxylic groups and carboxylic acid ester groups. The ratio less than 1/10 allows the excessive alcohol to cause popping upon curing, while that exceeding 1/1 yields remaining unreacted anhydride groups, resulting in a poor storage stability of the coating composition.

The hydroxyl group-containing compound (3)(ii) employed in the present invention may be, for example, a monohydric alcohol having 1 to 12, preferably 1 to 8 carbon atoms because of the advantage in regeneration of the acid anhydride groups by evaporation of alcohol upon heating. The hydroxyl group-containing compound preferably employed are methanol, ethanol, n-propanol, i-propanol, n-butanol, i-butanol, t-butanol, methyl cellosolve, ethyl cellosolve, N,N-dimethylaminoethanol, N,N-diethylaminoethanol, hydroxy-2-propanone, allyl alcohol, furfuryl alcohol, propargyl alcohol and the like. Particularly preferred are acetol, allyl alcohol, furfuryl alcohol, propargyl alcohol and methanol.

The polymer (3) preferably has an acid value of 30 to 250 mgKOH/g (solid), more preferably an acid value of 50 to 200 mgKOH/g (solid), most preferably 70 to 180 mgKOH/g (solid). If an acid value is more than 250 mgKOH/g (solid), water resistance of the coating film is poor. If it is less than 50 mgKOH/g (solid), curability of the coating film is deteriorated.

Component (4)

The polymer (4) having hydroxyl groups and epoxy groups employed in the present coating composition preferably has, on the average, 2 to 10, more preferably 3 to 8 epoxy groups and 2 to 12, more preferably 4 to 10 hydroxyl groups in one molecule. The epoxy equivalent is preferably 100 to 800, more preferably 200 to 600, and the hydroxy equivalent is preferably 200 to 1,200, more preferably 400 to 1,000. An epoxy equivalent exceeding the upper limit stated above results in insufficient curability of the coating composition, while that less than the lower limit results in undesirably rigid and brittle coating film. A hydroxy equivalent less than 200 results in insufficient water resistance of the cured coating film, while that exceeding 1,200 results in insufficient curability of the coating composition.

Such polymer (4) can be obtained by copolymerization of a hydroxyl group-containing ethylenically unsaturated monomer (4)(i) represented by the formula (i):

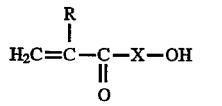

wherein R represents hydrogen or methyl group, X represents

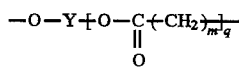

(Y is a straight or branched alkylene group having 2 to 8 carbon atoms, m is an integer from 3 to 7, and q is an integer from 0 to 4) or

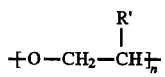

(R' represents hydrogen or methyl group and n is an integer of 2 to 50),
in an amount from 5 to 70% by weight, preferably from 15 to 50% by weight, a epoxy group-containing ethylenically unsaturated monomer (4)(ii) in an amount from 10 to 60% by weight, preferably from 15 to 50% by weight, and optionally other copolymerizable ethylenically unsaturated monomer (4)(iii) in an amount from 0 to 85% by weight, preferably from 10 to 60% by weight. The hydroxyl group-containing ethylenically unsaturated monomer in an amount of 5% by weight or less results in insufficient curability of the coating composition, while that in an amount of 70% by weight or more gives insufficient compatibility, resulting in the reaction being not proceeded satisfactorily. The epoxy group-containing ethylenically unsaturated monomer in an amount of 10% by weight or less results in insufficient curability of the coating composition, while that in an amount of 60% or more causes too rigid coating film which has poor weather resistance.

When the hydroxyl group-containing chain (X in Formula (I)) of the hydroxyl group-containing ethylenically unsaturated monomer (4)(i) used to prepare the polymer (4) having hydroxyl groups and epoxy groups is too short, flexibility around the crosslinking sites becomes poor, resulting in too rigid coating film. When such chain is too long, then the molecular weight between the crosslinking sites becomes too high. Accordingly, the chain X is preferably of 2 to 20 carbon atoms, more preferably 4 to 10 carbon atoms. Examples of the monomer (4)(i) are 4-hydroxybutyl (meth) acrylate, 6-hydroxyhexyl (meth)acrylate, 2-hydroxyethyl (meth)acrylate, 2-hydroxypropyl (meth)acrylate, 2-hydroxybutyl (meth)acrylate, and the reaction products thereof with ε-caprolactone. These compounds are commercially available, and include 4-hydroxybutyl acrylate (4 HBA from Mitsubishi Chemical Co., Ltd.), 4-hydroxybutyl methacrylate (4HBMA from Mitsubishi Chemical Co., Ltd.), Placcell FM1 and FA1 (from Daicel Chemical Industries Ltd.) and the like. Alternatively, such compounds may be synthesized by esterification of (meth)acrylic acid and far excessive diol (such as 1,4-butanediol, 1,6-hexanediol, polyethylene glycol or polypropylene glycol). Among them, a monomer derived from polypropylene glycol is available from Nippon Oil & Fats Co., Ltd. as Blemmer PP-1000 or Blemmer PP-800 and a monomer derived from polyethylene glycol is available from Nippon Oil & Fats Co., Ltd. as Blemmer PE-90 or Blemmer PE-350. The preferable monomer (4)(i) includes 4-hydroxybutyl (meth)acrylate, 6-hydroxyhexyl (meth)acrylate, the reaction product thereof with ε-caprolactone, a reaction product of 2-hydroxyethyl (meth)acrylate with ε-caprolactone and a reaction product of (meth)acrylic acid with far excessive polyethylene glycol or propylene glycol.

Examples of the monomer (4)(ii) are glycidyl (meth) acrylate and 3,4-epoxycyclohexanylmethyl (meth)acrylate. Examples of the other monomer (4)(iii) may be those listed above as "the other copolymerizable ethylenically unsaturated monomer (3)(i)(b)" for preparing the acid anhydride group-containing polymer (3)(i).

The copolymerization may be conducted by any of known methods, such as radical polymerization in solution, for example, at a polymerization temperature from 100° to 150° C. for a polymerization period from 3 to 8 hours. Peroxide initiators or azo initiators are preferably employed as the initiators. A radical polymerization initiator is preferably employed in an amount from 3 to 15% by weight based on the total monomer weight. Other additives such as a chain transfer agent may also be added to the above monomer composition. The polymer obtained is preferably has a number average molecular weight from 500 to 8,000, especially 1,500 to 5,000.

The proportions of the components (1) to (4) in the coating composition are as follows.

Component (1): 10 to 60% by weight, preferably 15 to 50% by weight, more preferably 20 to 40% by weight Component (2): 1 to 40% by weight, preferably 3 to 25% by weight, more preferably 3 to 15% by weight Component (3): 5 to 60% by weight, preferably 10 to 50% by weight, more preferably 10 to 40% by weight Component (4): 5 to 60% by weight, preferably 10 to 50% by weight, more preferably 10 to 40% by weight Any % by weight is based on the resin solid content (100% by weight) in the coating composition. The component (1) in an amount less than 10% by weight results in poor recoatability of the coating composition and appearance of the coating film, while that exceeding 60% by weight results in reduced curability of the coating composition and acid resistance of the coating film. The component (2) in an amount less than 1% by weight results in Insufficient curability of the coating composition, while that exceeding 40% by weight results in reduced acid resistance of the coating film. The component (3) in an amount less than 5% by weight results in poor acid resistance of the coating film, while that exceeding 60% by weight results in a too rigid coating film. The component (4) in an amount less than 5% by weight results in reduced curability of the coating composition, while that exceeding 60% by weight affects yellowing resistance of the coating film.

Composition (5)

The coating composition according to the present invention contains pigments (component (5)) in addition to the four components described above. The pigments which may be used are those well known in the art, including color pigments such as titanium dioxide, white lead, zinc sulfide, graphite, carbon black, yellow iron oxide, red iron oxide, phthalocyanine blue, phthalocyanine green, quinacridone, indanthrone, isoindolinone, perylene, anthrapyrimidine, benzimidazolone, iron oxide, cadmium yellow, cadmium red, chrome yellow, diketopyrrolopyrrole and the like. In addition, azo pigments, indigo pigments, anthraquinone pigment and the like may also be used.

The extender pigments which may be employed include inorganic substances such as calcium carbonate, magnesium carbonate, barium sulfate, silicic acid, silicate, aluminum hydrate, calcium sulfate, and the like.

The content of a pigment in the coating composition is usually represented as a weight ratio of pigment/resin solid in the coating composition, and is 0.01/1 to 1/1, preferably 0.03/1 to 0.9/1.

The pigment is usually formed into a pigment paste together with the resin of the component (1), and then incorporated to the coating. Methods of forming the pigment paste is well known in the art and performed using ball mill, sand mill and the like.

Component (6)

The coating composition of the present invention may contain an acrylic resin (6) having hydroxyl groups and carboxyl groups for the purpose of improving mar resistance in the cases of dark color coatings which tend to have reduced mar resistance, such as red, black, green and blue coatings. To improve the mar resistance, it is preferable that the distance from the polymer backbone to the hydroxyl group and the carboxyl group of the acrylic resin (6) corresponds to 4 to 20 carbon atoms. Such acrylic resin (6) is preferably component (a) in Claim 1 of Japanese Patent Application Ser. No. Hei5(1993)-181262. Especially, a polymer obtained by copolymerizing a mixture of a carboxyl group-containing ethylenically unsaturated monomer and a hydroxyl group-containing ethylenically unsaturated monomer, obtained by reacting the hydroxyl group-containing ethylenically unsaturated monomer represented by the formula (I) employed in the component (4) with an acid anhydride group-containing compound in a molar ratio of hydroxyl group/acid anhydride group from 1/0.9 to 1/0.5, optionally together with other ethylenic monomers.

The amount of the component (6) to be incorporated is generally 1 to 30% by weight, preferably 5 to 15% by weight based on the solid content of the composition. The component (6) in an amount less than 1% by weight involves a disadvantage of reduced mar resistance of a dark color coating film, while that exceeding 30% by weight results in a coating film which is too soft.

Component (7)

In order to further improve mar resistance and to increase solid content, a silicone polymer having hydroxyl groups and a carboxyl groups obtained by half esterification of (i) a hydroxyl group-containing silicone polymer having on the average 3 to 12 hydroxyl groups in a molecule which is at least one selected from the group consisting of the compounds having the structure:

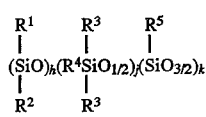

(wherein $R^1$ is methyl, phenyl or phenylethyl group, $R^2$ and $R^3$ are independently methyl, phenyl, phenylethyl, 3-hydroxy propyl or 3-(hydroxyethoxy)propyl group, $R^4$ is methyl, 3-hydroxypropyl or 3-(hydroxyethoxy)propyl group, R5 is methyl, phenyl, phenylethyl or isobutyl group provided that at least one of $R^2$, R3 and R4 represents 3-hydroxypropyl or 3-(hydroxyethoxy)propyl, h is an integer from 1 to 20, j is an integer from 2 to 4, k is an integer from 0 to 2, and the order of each of the bracketed groups h, j and k is interchangeable and is not limited to that represented), and (ii) an acid anhydride group-containing compound, in a ratio of the hydroxyl group/the acid anhydride group of 1/1.0 to 1/0.2 may also be incorporated to the present composition. This silicone polymer may be added to the system which does not contain the component (6) or may be added together with the component (6) to the present composition.

The silicone polymer (7) having hydroxyl groups and carboxyl groups is obtained by subjecting the hydroxyl group-containing silicone polymer (7)(i) and the acid anhydride group-containing compound (7)(ii) to the half esterification.

A method of preparing the hydroxyl group-containing silicone polymer (7)(i) used in the present invention is described in "Summary of organic silicon materials chemistry symposium in 1990", page 29 to 30. Several types of the silicone polymer (7) are commercially available, including KR-2001 from Sin-Etsu Chemical Co., Ltd. and NUC-Silicone series from Nippon Unicar. Chemical formulae of the commercially available silicone polymers are shown below.

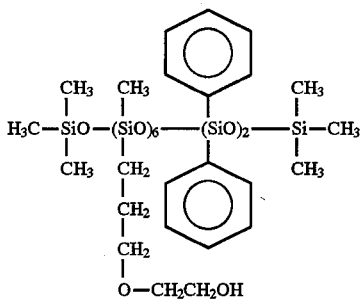

-continued

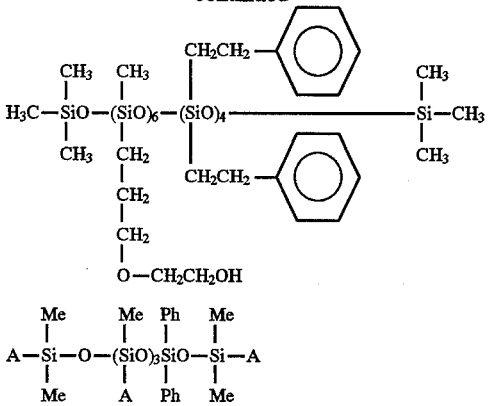

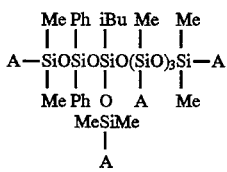

wherein Me represents methyl group, Ph represents phenyl group, and A is 3-(hydroxyethoxy) propyl group.

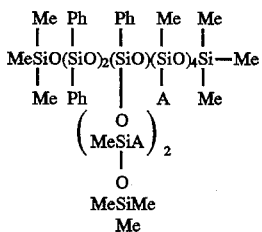

wherein Me, Ph and A are as defined above, and iBu represents isobutyl roup.

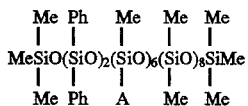

wherein Me, Ph and A are as defined above.

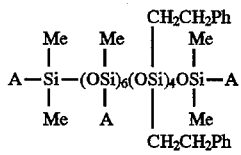

wherein Me, Ph and A are as defined above.

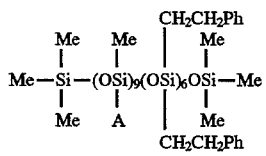

wherein Me, Ph and A are as defined above.

Preferably, the hydroxyl group-containing silicone polymer (7)(i) contains, on the average, 3 to 12 hydroxyl groups in one molecule. Average number of the hydroxyl groups contained in one molecule of the hydroxyl group-containing silicone polymer (7)(i) less than 3 results in insufficient curability of the coating composition, while that exceeding 12 gave increased viscosity, resulting in reduced amount of non-volatile components.

The acid anhydride group-containing compound (7)(ii) employed in the present invention is any of those capable of reacting with the hydroxyl groups under an ordinary condition such as room temperature to 120° C. and atmospheric pressure whereby yielding carboxyl functionalities. In the present invention, it is preferable to employ an acid anhydride group-containing compound having a cyclic (unsaturated or saturated) group having 8 to 12 carbon atoms, since such compound provides satisfactory compatibility of the resin. Examples of preferable acid anhydride group-containing compounds (7)(ii) are hexahydrophthalic anhydride, phthalic anhydride, 4-methylhexahydrophthalic anhydride, tetrahydrophthalic anhydride and trimellitic anhydride, etc.

The half esterification of the hydroxyl group-containing silicone polymer (7)(i) and the acid anhydride group-containing compound (7)(ii) is conducted according to a standard procedure, and may, for example, be conducted at room temperature to 120° C. for 30 minutes to 8 hours. The reaction under a severe condition, such as the reaction at a temperature exceeding 120° C. for a prolonged period, causes esterification, resulting in the formation of high molecular silicone polyesters. Such silicone polyesters have decreased number of functional groups and have increased viscosity, and thus are not preferable in the present invention. The reaction is preferably conducted at a molar ratio of the hydroxyl group/the acid anhydride group from 1/1.0 to 1/0.2. A ratio exceeding 1/0.2 causes insufficient water resistance of the coating film, while that less than 1/1.0 gives excess amount of acid anhydride remaining in the system, thus allowing side reactions to take place when used in a coating composition.

The silicone polymer having hydroxyl groups and carboxyl groups thus obtained preferably has a number average molecular weight (Mn) from 500 to 6,000, especially from 1,000 to 4,500. A number average molecular weight exceeding 6,000 results in increased viscosity and reduced amount of non-volatile components of the coating composition, while that less than 500 results in insufficient curability. In addition, the silicone polymer having hydroxyl groups and carboxyl groups preferably has an acid value of from 20 to 180 mgKOH/g (solid), particularly from 35 to 150 mgKOH/g (solid), and a hydroxyl value of from 2 to 120 mgKOH/g (solid), particularly from 10 to 100 mgKOH/g (solid). An acid value of less than 20 mgKOH/g (solid) results in insufficient curability of the coating composition, while that exceeding 180 mgKOH/g (solid) results in reduced amount of non-volatile components of the coating composition. The number average molecular weights of the polymers employed in the present specification are obtained by GPC method.

The content of the component (7) in the coating composition is within the range of 5 to 50% by weight, preferably 6 to 30% by weight, more preferably 8 to 25% by weight, based on the weight of the resin solid content of the coating composition. An amount less than 5% by weight results in poor mar resistance of the coating film, while that exceeding 50% by weight gives too soft coating film, resulting in reduced acid resistance.

The relationship among the contents (weight) of the components mentioned above is preferably as shown below.
4/6<Component(3)+Component(4)(+Component(6) or (7))/Component(1)<9/1  6/4<Component(1)+Component(3)+Component(4)(+Component(6) or (7))/Component(2)

In the formula shown above, (+Component(6) or (7)) means that the amount of the component (6) or (7) is added if the component (6) or (7) is present. An amount of the component (1) less than 10% by weight based on the components (3)+(4)(+(6) or (7)) results in poor recoatability, while that exceeding 60% by weight results in poor water resistance of the coating film. An amount of the aminoplast resin (the component (2)) exceeding 40% by weight based on the components (1)+(3)+(4)(+(6) or (7)) results in poor acid resistance.

In addition to the components described above, curing catalysts usually employed in the esterification of an acid and an epoxy, such as quaternary ammonium salts may also be contained in the curable resin compositions according to the present invention. Examples of other catalysts employed in the curable resin compositions according to the present invention are benzyltriethylammonium chloride, benzyltriethylammonium bromide, tetrabutylammonium chloride, tetrabutylammonium bromide, tetrabutylammonium salicylate, tetrabutylammonium glycolate, tetrabutylammonium p-toluenesulfonate and the like as well as the mixture thereof. The content of the catalyst is preferably 0.1 to 2.0% by weight, preferably 0.1 to 1.5% by weight, more preferably 0.4 to 1.2% by weight, based on the solid content of the resin composition. Amounts of more than 2.0% by weight reduce storage stability of the coating composition and those of less than 0.1% by weight decrease curability. As described in Japanese Kokai Publications Hei2(1990)-151651 and Hei2(1990)-279713, tin-based compounds may be used in combination. Such tin-based compounds are, for example, dimethyl tin bis(methylmaleate), dimethyl tin bis(ethylmaleate), dimethyl tin bis(butylmaleate), dibutyl tin bis(butylmaleate) and the like. The weight ratio of the curing catalyst and the tin compound is preferably 1/4 to 1/0.2. An amount of the tin-based compound preferably is within the range of 0.05 to 6.0% by weight, more preferably 0.1 to 4.0% by weight, most preferably 0.4 to 3.0% by weight, based on the solid content of resin composition. Amounts of less than 0.05% by weight decrease storage stability of the coating composition and those of more than 6.0% by weight reduce weather resistance of the coating film.

For the purpose of increasing the crosslinking density and improving the water resistance, the resin composition of the present invention may contain a blocked isocyanate compound. Ultraviolet absorbing agents and hindered amine light stabilizer, antioxidants, etc. may also be added in order to improve weather resistance of the coating film. Crosslinked resin particles as theology controllers and surface modifiers for the modification of the appearance may also be added. Also in order to adjust the viscosity, solvents such as alcohol solvents (e.g., methanol, ethanol, propanol and butanol, etc.), hydrocarbons and esters may be employed as diluents.

The resins used in the present invention contain acid groups as functional groups. Accordingly, neutralization with amines provides an aqueous coating composition containing water as a medium.

The methods of preparing the coating compositions of the present invention are not specifically limited, and any of those known in the art may be employed.

The coating compositions of the present invention may be applied by spray coating, brush coating, immersion coating, roll coating, cast coating and the like. An under coat or intermediate coat may be applied to the substrate to be coated with the present composition. Such under coat and intermediate coat may be any of those well known in the art.

The present coating compositions may advantageously be applied to any of the substrates such as woods, metals, glasses, fabrics, plastics, foams, especially to the surfaces of the plastics and metals, for example, steel, aluminum and the alloys thereof.

Generally, the thickness of the coating film may vary depending on the desirable applications. In most of the cases, a thickness from 0.5 to 3 mil is useful.

After coating the substrate, the coating film is cured. A curing temperature from 100° to 180° C., preferably from 120° to 160° C. provides a highly crosslinked cured coating. Although the time of curing may vary depending on other factors such as the curing temperature, a curing time from 10 to 30 minutes is appropriate at a temperature from 120° to 160° C.

EXAMPLES

The present invention is further described in the following examples, which are not intended to restrict the scope of the invention. Contents of the components are by weight unless otherwise specified.

Synthesis 1: Synthesis of carboxyl group-containing ethylenically unsaturated monomer In a 2 L reaction vessel fitted with a thermometer, stirrer, condenser, nitrogen inlet and drip funnel, 360 parts of arcosolv PMA solvent (Kyowa Yuka Co., Ltd., propylene glycol monoethyl ether acetate), 777 parts of 4-hydroxybutyl acrylate, 665 parts of hexahydrophthalic anhydride and 0.48 part of hydroquinone monomethyl ether were charged, and the mixture was heated to 145° C., at which the mixture was kept for 20 minutes. After cooling, the mixture was taken from the reaction vessel to yield a carboxyl group-containing ethylenically unsaturated monomer.

Synthesis 2: Synthesis of Polymer A containing hydroxyl groups and carboxyl groups In a 3 L reaction vessel fitted with a thermometer, stirrer, condenser, nitrogen inlet and drip funnel, 300 parts of xylene and 200 parts of arcosolv PMA solvent were added and the mixture was heated to 130° C. Then, 300 parts of the carboxyl group-containing ethylenically unsaturated monomer obtained in Synthesis 1 and 100 parts of t-butylperoxy 2-ethyl hexanoate were added dropwise over the period of 3 hours. After keeping at 130° C. for 30 minutes, the mixture of 10 parts of t-butylperoxy 2-ethylhexanoate and 100 parts of xylene was added dropwise over 30 minutes. After keeping at 130° C. for 30 minutes, the mixture was taken from the vessel to obtain Polymer A containing hydroxyl groups and carboxyl groups. This polymer was a transparent liquid having the content of the non-volatile components of 54%, the number average molecular weight of 2,000, the acid value as solid of 168 mgKOH/g(solid) and the hydroxyl value of 40 mgKOH/g(solid).

Synthesis 3: Synthesis of acid anhydride containing polymer (b-1)

In a reaction tank fitted with a thermometer, stirrer, condenser, nitrogen inlet and drip funnel, 55 parts by weight of xylene was charged and the mixture was heated to 120° C.

To this tank, using a drip funnel, 30 parts by weight of styrene monomer, 11 parts by weight of 2-ethylhexyl acrylate, 37 parts by weight of 2-ethylhexyl methacrylate, 22 parts by weight of maleic anhydride, 30 parts by weight of propylene glycol monomethyl ether acetate and 10 parts by weight of t-butylperoxy 2-ethylhexanoate were added dropwise over 3 hours, and then stirring was continued for further 2 hours to obtain resin varnish (b-1) containing acid anhydride having the content of non-volatile components of 53% and the number average molecular weight of 3,300.

Synthesis 4: Synthesis of acid anhydride containing polymer (b-2)

Similarly as in Synthesis 3, the components shown in Table 1 were used to obtain polymer (b-2) containing acid anhydride groups. The polymer obtained had the content of non-volatile components of 52% and the number average molecular weight of 3,300.

TABLE 1

| Component | parts by weight |
| --- | --- |
| Solvesso 100 | 22 |
| Xylene | 11 |
| Styrene monomer | 30 |
| Cyclohexyl acrylate | 40 |
| Maleic anhydride | 30 |
| Propylene glycol monomethyl ether acetate | 40 |
| t-Butylperoxy 2-ethylhexanoate | 10 |
| Butyl acetate | 29 |

Synthesis 5: Preparation of half-esterified resin (B-1), (B-2), (B-3) and (B-4)

To 175 parts by weight of polymer (b-1) obtained in Synthesis 3, 1.4 parts by weight of triethylamine and 8.6 parts by weight of methanol were added, and the mixture was reacted at 40° C. for 2 hours to obtain half-esterified resin (B-1). This resin (B-1) was subjected to infrared absorption spectrometry, whereby confirming absence of the absorption corresponding to acid anhydrides (1785 cm$^{-1}$).

Similarly to resin (B-1), half-esterified resins (B-2), (B-3) and (B-4) were obtained using the components shown as follow.

| | Components | Parts by weight |
| --- | --- | --- |
| Resin (B-2) | Polymer (b-2) | 175 |
| | Triethylamine | 1.4 |
| | Methanol | 8.6 |
| Resin (B-3) | Polymer (b-1) | 175 |
| | Triethylamine | 1.4 |
| | Furfuryl alcohol | 23.6 |
| Resin (B-4) | Polymer (b-1) | 175 |
| | Triethylamine | 1.4 |
| | Methanol | 35.8 |

Synthesis 6: Synthesis of resin (C-1) containing epoxy groups and hydroxyl groups In a reaction tank fitted with a thermometer, stirrer, condenser, nitrogen inlet and drip funnel, 52 parts by weight of xylene and 5 parts by weight of butyl acetate were charged and the mixture was heated to 120° C.

To this tank, using a drip funnel, 17 parts by weight of styrene monomer, 32 parts by weight of glycidyl methacrylate, 41 parts by weight of Placcel FM-1 (Daicel Chemical industries, Ltd.), 10 parts by weight of 2-ethylhexyl acrylate and 11 parts by weight of t-butylperoxy 2-ethylhexanoate were added dropwise over 3 hours.

After completion of the addition, the mixture was kept at 120° C. for further 30 minutes, and then the solution consisting of 1 part by weight of t-butylperoxy 2-ethylhexanoate and 2 parts by weight of xylene was added dropwise over 30 minutes.

After completion of the addition, the reaction was further proceeded at 120° C. for 2 hours to obtain resin varnish (C-1) having the epoxy equivalent of and the hydroxyl equivalent of 591.

Synthesis 7

Similarly as in Synthesis 6, resin (C-2) having the epoxy equivalent of 400 and the hydroxyl equivalent of 401 was synthesized from the components shown in Table 2.

TABLE 2

| Component | Parts by weight |
| --- | --- |
| Xylene | 38 |
| Butyl acetate | 15 |
| Styrene monomer | 23 |
| Glycidyl methacrylate | 36 |
| 2-Hydroxybutyl acrylate | 31 |
| 2-Ethylhexyl acrylate | 10 |
| t-Butylperoxy 2-ethylhexanoate | 10 |

Synthesis 8: Synthesis of polyester resin (D-1)

In a 2 L reaction tank fitted with a thermometer, stirrer, condenser, nitrogen inlet, water separator and rectifying column, 159 parts by weight of palm oil, 252.7 parts by weight of trimethylol propane and 0.2 part by weight of dibutyl tin oxide were charged, and the temperature of the mixture was raised to 220° C. over 2 hours. This temperature was kept for about 30 minutes whereby completing the ester interchange. The completion of the ester inter change was confirmed by means of methanol tolerance. After cooling, 128.1 parts of isophthalic acid, 238.5 parts by weight of hexahydrophthalic anhydride, 112.7 parts by weight of adipic acid, 98.2 parts by weight of pentaerythritol and 90.9 parts by weight of methylpentane diol were added and the mixture was heated. Once the materials melted and the stirring became possible, the stirring was initiated and the temperature of the reaction tank was raised to 220° C. During the period of raising from 180° to 220° C., the temperature was raised over 3 hours at a constant raising rate. Condensation water formed was distilled out of the system. When the temperature reached 220° C., the mixture was kept at this temperature for 1 hour, and subsequently aliquots of each 10 parts of xylene were added as reflux solvent to the reaction tank, whereby effecting the change into the condensation in the presence of the solvent for further reaction. Once the acid value of the resin reached 10.0, the mixture was cooled to 180° C. 200 Parts by weight of ε-caprolactone (Daicel Chemical Industries, ltd.) was added and the temperature was kept for 1 hour. Then the mixture was cooled to 100° C., to which 480 parts by weight of xylene was added to obtain polyester resin (D-1) varnish. The resulting resin had an acid value of 10 mgKOH/g (solid), a hydroxyl value of 220 mgKOH/g (solid) and a number average molecular weight of 1,600.

Synthesis 9: Synthesis of polyester resin (D-2)

143 Parts by weight of polyester resin varnish obtained in Synthesis 8 was admixed with 6 parts by weight of Cymel 254 (Mitsui Cyanamide) and 7 parts by weight of xylene, and the mixture was kept at 110° C. for 1 hour to obtain melamine co-condensation polyester resin (D-2).

Synthesis 10: Synthesis of polyester resin (D-3)

In a reaction tank fitted with a thermometer, stirrer, condenser, nitrogen inlet and drip funnel, 156 parts by weight of melamine co-condensation polyester resin obtained in Synthesis 9 was placed and heated to 80° C.

To this tank, using a drip funnel, 1.95 parts by weight of HPAC, 1.3 parts by weight of n-butanol and 5.0 parts by weight of xylene were added dropwise over 30 minutes. After the stirring was continued for further 30 minutes, base-modified polyester resin varnish (D-3) was obtained.

Synthesis 11: Synthesis of polyester resin (D-4)

In a 2 L reaction tank fitted with a thermometer, stirrer, condenser, nitrogen inlet, water separator and rectifying column, 477 parts by weight of palm oil, 275 parts by weight of trimethylol propane and 0.2 part by weight of dibutyl tin oxide were placed, and the temperature of the mixture was raised to 220° C. over 2 hours. This temperature was kept for about 30 minutes whereby completing the ester interchange. The completion of the ester interchange was confirmed by means of methanol tolerance. After cooling, 143 parts by weight of isophthalic acid, 264 parts by weight of hexahydrophthalic anhydride, 125 parts by weight of adipic acid, 107 parts by weight of pentaerythritol and 135 parts by weight of methylpentane diol were added and the mixture was heated. Once the materials melted and the stirring became possible, the stirring was initiated and the temperature of the reaction tank was raised to 220° C. During the period of raising from 180° to 220° C., the temperature was raised over 3 hours at a constant raising rate. Condensation water formed was distilled out of the system. When the temperature reached 220° C., the mixture was kept at this temperature for 1 hour, and subsequently aliquots of each 10 parts of xylene were added as reflux solvent to the reaction tank, whereby effecting the change into the condensation in the presence of the solvent for further reaction. Once the acid value of the resin reached 10.0, the mixture was then cooled to 180° C., to which 63 parts by weight of Placcel M (Daicel Chemical Industries, Ltd.) was added and the temperature was kept for 1 hour. Then the mixture was cooled to 100° C., to which 480 parts by weight of xylene was added to obtain polyester resin (D-4) varnish. The resulting resin had an acid value of 10 mgKOH/g (solid), a hydroxyl value of 188 mgKOH/g (solid) and a number average molecular weight of 1,000.

Synthesis 12: Synthesis of polyester resin (D-5)

In a 2 L reaction tank fitted with a thermometer, stirrer, condenser, nitrogen inlet, water separator and rectifying column, 213 parts by weight of trimethylol propane, 184 parts by weight of isophthalic acid, 258 parts by weight of hexahydrophthalic anhydride, 180 parts by weight of neopentyl glycol, 72 parts by weight of hydroxy pivalic acid neopentyl glycol ester and 0.2 part by weight of dibutyl tin oxide were added and the mixture was heated. Once the materials melted and the stirring became possible, the stirring was initiated and the temperature of the reaction tank was raised to 220° C. During the period of raising from 180° to 220° C., the temperature was raised over 3 hours at a constant raising rate. Condensation water formed was distilled out of the system. After the temperature reached 220° C., the mixture was kept at this temperature for 1 hour, and subsequently aliquots of each 10 parts of xylene were added as reflux solvent to the reaction tank, whereby effecting the change into the condensation in the presence of the solvent for further reaction. Once the acid value of the resin reached 10.0, the mixture was cooled to 160° C., to which 182 parts by weight of Placcel M (Daicel Chemical Industries, Ltd.) was added and the temperature was kept for 2 hour. Then the mixture was cooled to 100° C. 270 parts by weight of xylene was further added to obtain polyester resin varnish (D-5). The resulting resin had an acid value of 8 mgKOH/g (solid), a hydroxyl value of 190 mgKOH/g (solid) and a number average molecular weight of 1,000.

Synthesis 13; Synthesis of polyester resin (D-6)

143 parts by weight of the polyester resin (D-5) varnish obtained in Synthesis 12 was admixed with 6 parts by weight of Cymel 254 (Mitsui Cyanamide) and 7 parts by weight of xylene, and the mixture was kept at 110° C. for 1 hour to obtain melamine co-condensation polyester resin varnish (D-6).

E-1: Uban 20N-60: Butylated melamine (Mitsui Toatsu Kagaku) was employed.

E-2: Cymel 202: Methyl-butyl mixed alkylated melamine (Mitsui Cyanamide) was employed.

F-1: CR-97: Titanium oxide (Ishihara Sangyo) was employed.

White pigment paste used in the examples was made by mixing the following components.

| Composition of white pigment paste | |
| --- | --- |
| Component | parts by weight |
| CR-97 | 600 |
| D-2 resin varnish | 308 |
| Xylene | 46 |
| Butyl acetate | 46 |

White pigment paste used in the comparative example 8 was made by mixing the following components.

| Component | parts by weight |
| --- | --- |
| CR-97 | 600 |
| C-1 resin varnish | 308 |
| Xylene | 46 |
| Butyl acetate | 46 |

F-2: Irgagine red DPP-BO: Pyrrol-based red pigment (Ciba-Geigy) was employed.

2 types of red pigment paste, one for D-2 resin varnish and the other for D-6 resin varnish, were prepared. The compositions are shown below.

| Red pigment paste | | | |
| --- | --- | --- | --- |
| Component | parts by weight | Component | parts by weight |
| Irgagine red DDP-BO | 144 | Irgagine red DDP-BO | 144 |
| D-2 resin varnish | 332.4 | D-6 resin varnish | 332.4 |
| Xylene | 61.8 | Xylene | 61.8 |
| Butyl acetate | 61.8 | Butyl acetate | 61.8 |

F-3: FW-200P: Carbon black (Degusa) was used. Black pigment paste was prepared by mixing the components shown below.

| Black pigment paste | |
| --- | --- |
| Component | parts by weight |
| FW-200P | 40.5 |
| D-3 resin varnish | 354.1 |
| Xylene | 102.7 |
| Butyl acetate | 102.7 |

G: Tetrabutylammonium bromide was used as a curing catalyst.

H: Modaflow (Monsanto) was employed as a surface modifier.

Example of dispersion of pigment paste

The pigment paste compositions shown above were placed in a 2 L vessel, and dispersed using a tabletop sand mill (Ohira System) at 2000 rpm for 3 hours. The pigment in the pigment pastes had a particle size of less than 5 μm. The resulting pigment pasts had low viscosity and good stability sufficient for the following formulations Formulation examples: Relationship of incorporation Examples 1 to 14, Comparative Examples 1 to 6

Using respective pigment pastes corresponding to the pigment dispersing resins, the coating compositions having the solid contents shown in Table 3 were formulated. As a control, currently employed coating composition was used and formed into a coating according to the method of coating which was then evaluated for acid resistance and mar resistance of the coating film. The results are shown also in Table 3.

Comparative Examples 7 and 8

As a comparative with regard to the adhesiveness, the coating composition shown in Table 4 were formulated using polyester resin (D-4) obtained in Synthesis 11. As a control, the coating composition in Example 1 was employed and applied to the substrate having an under coat and an intermediate coat, and then evaluated according to the adhesiveness (capability of adhering to the under coat) evaluation method.

Also as a comparative with regard to the weathering resistance, the coating composition shown in Table 4 were formulated using the pigment paste in which the pigment was dispersed in resin (C-1) obtained in Synthesis 6. As a control, the coating composition in Example 1 was evaluated. The results of evaluations for adhesiveness (capability of adhering to the under coat) and for weather resistance of the coating film are shown in Table 4.

1) Method of coating

To a dull steel plate treated with zinc phosphate having the thickness of 0.8 mm, cation electrodeposition coating (Nippon Paint, Powertop pu-50) was deposited electrically to have the dry thickness of about 25 μm.

To the electrodeposited coating thus obtained, inter mediate coating composition (Nippon Paint, Orga P-2 Sealer) was air-sprayed to have the dry thickness of about 40 μm, and then cured at 140° C. for 30 minutes. Subsequently, the coating compositions having the solid contents shown in Table 3 and Table 4 were formulated and adjusted to have the viscosity of 25 seconds when determined with Ford cup No.4. The compositions thus formulated were applied with the air-spray to have the dry thickness of about 40 μm. After setting for about 7 minutes, the coating was cured at 140° C. for 30 minutes.

Evaluation method of the coating film

1) Acid resistance

1% by weight solution of sulfuric acid was kept at 60° C. and the test pieces were immersed in this solution for 24 hours. Then the test pieces were taken out and evaluated for the gloss retention of 60° as follows.

Gloss retention

⊙: 90 or higher

○: 70 or higher and less than 90

Δ: 40 or higher and less than 70

×: less than 40

2) Mar resistance

50% Aqueous solution of a cleanser (available from Kaneyo K.K.) was applied to a two-folded flannel fabric in the amount of about 1 cc, and the fabric was mounted on reciprocating head of the friction resistance tester of Gakushin type. With a loading of 700g, the head was moved reciprocally 10 times, and then the 20° gloss of the tested portion was determined to obtain the gloss retention. The evaluation was conducted as described in section 1) above. The results are shown in Table 3.

TABLE 3

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| A | | | | | | | | | 4.7 | | 5.1 | 5.1 | 4.7 | 9.4 |
| B-1 | 15.8 | | | | | 16.6 | 23.7 | 23.7 | 19.0 | 23.7 | 20.4 | 20.4 | | |
| B-2 | | | | 13.5 | 14.4 | | | | | | | | 18.6 | 13.9 |
| B-3 | | 22.8 | | | | | | | | | | | | |
| B-4 | | | 9.5 | | | | | | | | | | | |
| C-1 | 14.9 | 20.6 | 8.5 | 16.5 | | | 21.3 | 21.3 | 21.3 | 21.3 | 23.0 | 23.0 | | |
| C-2 | | | | | 15.6 | 13.4 | | | | | | | 25.2 | 25.2 |
| D-1 | 10.7 | | 20.3 | 10.7 | 10.7 | 10.7 | 21.0 | 16.5 | 16.5 | | 21.8 | 21.8 | 21.8 | 27.5 |
| D-2 | 13.3 | 13.3 | 13.3 | 13.3 | 13.3 | 13.3 | 15.0 | 15.0 | 15.0 | | | | | |
| D-3 | | | | | | | | | | | 17.0 | 17.0 | 17.0 | |
| D-5 | | | | | | | | | | 21.0 | | | | |
| D-6 | | | | | | | | | | 15.0 | | | | |
| E-1 | 6.0 | 3.3 | 8.4 | 6.0 | 6.0 | 6.0 | 9.0 | | 9.0 | 9.0 | 9.7 | | | |
| E-2 | | | | | | | | 13.5 | | | | 13.5 | 13.5 | 13.5 |
| F-1 | 40.0 | 40.0 | 40.0 | 40.0 | 40.0 | 40.0 | | | | | | | | |
| F-2 | | | | | | | 10.0 | 10.0 | 10.0 | 10.0 | | | | |
| F-3 | | | | | | | | | | | 3.0 | 3.0 | 3.0 | 3.0 |
| G | 0.3 | 0.3 | 0.3 | 0.3 | 0.3 | 0.3 | 0.5 | 0.5 | 0.5 | 0.5 | 0.5 | 0.5 | 0.5 | 0.5 |
| H | 0.1 | 0.1 | 0.1 | 0.1 | 0.1 | 0.1 | 0.1 | 0.1 | 0.1 | 0.1 | 0.1 | 0.1 | 0.1 | 0.1 |
| Acid resistance | ⊙ | ⊙ | ○ | ⊙ | ⊙ | ⊙ | ⊙ | ⊙ | ⊙ | ⊙ | ⊙ | ⊙ | ⊙ | ⊙ |
| Mar resistance | ⊙ | ⊙ | ⊙ | ⊙ | ⊙ | ⊙ | ○ | ○ | ⊙ | ○ | ⊙ | ⊙ | ⊙ | ⊙ |

| | Comparative | | | | | |
|---|---|---|---|---|---|---|
| | 1 | 2 | 3 | 4 | 5 | 6 |
| A | | | 1.3 | | | Current melamine-based red paint |
| B-1 | 4.7 | 7.1 | | 25.5 | | |
| B-2 | | | 5.2 | | 23.3 | |
| B-3 | | | | | | |
| B-4 | | | | | | |

TABLE 3-continued

|   | | | | | |
|---|---|---|---|---|---|
| C-1 | 4.3 | 6.4 |  | 23.0 |  |
| C-2 |  |  | 7.0 |  | 25.2 |
| D-1 | 13.3 | 46.2 | 40.7 | 21.8 | 21.8 |
| D-2 |  |  |  |  |  |
| D-3 |  | 15.0 | 17.0 | 17.0 | 17.0 |
| D-5 |  |  |  |  |  |
| D-6 |  |  |  |  |  |
| E-1 | 10.2 | 15.3 | 24.7 | 9.7 | 13.5 |
| E-2 |  |  |  |  |  |
| F-1 | 40.0 |  |  |  |  |
| F-2 |  | 10.0 |  |  |  |
| F-3 |  |  | 3.0 | 3.0 | 3.0 |
| G | 0.3 | 0.5 | 0.5 | 0.5 | 0.5 |
| H | 0.1 | 0.1 | 0.1 | 0.1 | 0.1 |
| Acid resistance | Δ | Δ | Δ | ○ | ○ | X |
| Mar resistance | ⊙ | ○ | ⊙ | Δ | Δ | Δ |

In Table 3, the current melamine-based red paint in Comparative Example 6 had the following formulation.

| Ingredients | Parts by weight |
|---|---|
| Irgagin Red DPP BO (red pigment) | 3.5 |
| Chlomophthal Red A2B (red pigment) | 1.0 |
| Polyester resin*¹ | 25.0 |
| Alkyd resin*² | 12.0 |
| Uban 128*³ | 15.0 |
| Disperon KS-281*⁴ | 0.2 |
| n-Butanol | 9.0 |
| S-100 | 21.0 |

*¹A polyester resin having an acid value of 5, a hydroxyl value of 80, a number average molecular weight of 3,380 and a weight average molecular weight of 27,200, available from Nippon Paint Co., Ltd.
*²An alkyd resin having an oil length of 20 (coconut oil), an acid value of 8, a hydroxyl value of 110, a number average molecular weight 2,700 and weight average molecular weight of 16,000, available from Nippon Paint Co., Ltd.
*³A melamine resin available from Mitsui-Toatsu Co., Ltd.
*⁴A surface conditioner available from Kusumoto Kasei Co., Ltd.

3) Adhesiveness (capability of adhering to under coat)

An electric furnace was kept at 190° C., and 6g of 5% solution of nitric acid was added to a 500 ml vessel, which was then placed in the electric furnace together with a test piece having an intermediate coating (Nippon Paint, Orga P-2 Sealer) on the electrodeposited coating. At that time, the concentration of NOx when determined by a luminescence nitrogen oxide analyzer for waste gas in fume tunnel (Shimadzu, Model NOA-304) was 30 ppm. After curing for 30 minutes, the test piece was cooled in a desiccator, air-sprayed with the top coat coating formulated to have the dry thickness of 40 μm, and then cured at 120° C. for 30 minutes. Subsequently, the coating on the piece was cut into 100 2 mm squares still on the substrate and evaluated for peeling by the tape test. The adhesiveness was represented as the number of the squares peeled. The results are shown in Table 4.

4) Weather resistance

1 Cycle consisting of irradiation with Eye super UV tester (Iwasaki Denki Co., Ltd.) for 24 hours followed by exposure to 100% humidity at 50° C. for 24 hours was repeated 5 times and then the gloss was determined. The results are shown in Table 4.

TABLE 4

Adhesiveness (capability of adhering to under coat) and weathering resistance

|  |  | Example | Comparative | |
|---|---|---|---|---|
|  |  | 1 | 7 | 8 |
| B-1 |  | 15.8 | 15.8 | 15.8 |
| C-1 |  | 14.9 | 14.9 | 14.9 |
| D-1 |  | 10.7 |  | 10.7 |
| D-2 |  | 13.3 | 13.3 | 13.3 |
| D-4 |  |  | 10.7 |  |
| E-1 |  | 6.0 | 6.0 | 6.0 |
| F-1 |  | 40.0 | 40.0 | 40.0 |
| G |  | 0.3 | 0.3 | 0.3 |
| H |  | 0.1 | 0.1 | 0.1 |
| Adhesiveness |  | 0/100 | 40/100 | 0/100 |
| Weather resistance | Initial gloss (60°) | 91 | 91 | 90 |
|  | Gloss after SUV 5 cycles | 75 | 73 | 40 |
| Resin for pigment dispersion |  | D-2 | D-4 (Departing from range of alkyd) | C-1 (Acrylic resin dispersion) |

Synthesis 14: Synthesis of silicone polymer (I-1) having hydroxyl groups and carboxyl groups In a 2 L reaction vessel fitted with a thermometer, stirrer, condenser, and nitrogen inlet, 140 parts of butyl acetate, 1088 parts of KR-2001 (Shin-Etsu Chemical Co., Ltd.) and 370 parts of hexahydrophthalic anhydride were charged and the mixture was heated to 125° to 130° C. and reacted for 2 hours. After confirming the absence of acid anhydride groups by IR analysis, 206 parts of butyl acetate was added to obtain a colorless transparent varnish substance. Silicone polymer (I-1) obtained which had hydroxyl groups and carboxyl groups had the non-volatile content of 80% and the acid value of 95 mgKOH/g (solid).

Synthesis 15: Synthesis of silicone polymer (I-2) having hydroxyl groups and carboxyl groups Similarly as in Synthesis 1, silicone polymer (I-2) having hydroxyl groups and carboxyl groups were obtained using the components shown below. The polymer obtained had the non-volatile content of 80% and the acid value of 47 mgKOH/g(solid).

| Component | Parts by weight |
| --- | --- |
| KR-2001 | 1401.7 |
| Hexahydrophthalic anhydride | 176.7 |
| Butyl acetate | 377.0 |

Synthesis 16: Synthesis of polymer containing acid anhydride groups (b-5)

In a reaction tank fitted with a thermometer, stirrer, condenser, nitrogen inlet and drip funnel, 105 parts by weight of xylene was placed and the mixture was heated to 130° C.

To this tank, using a drip funnel, the monomers consisting of 30 parts by weight of styrene monomer, 11 parts by weight of 2-ethylhexyl acrylate, 37 parts by weight of 2-ethylhexyl methacrylate, 22 parts by weight of maleic anhydride, 30 parts by weight of propylene glycol monomethyl ether acetate and 15 parts by weight of t-butylperoxy 2-ethylhexanoate and the initiator solution were added dropwise over 3 hours, and the mixture was kept at 130° C. for 30 minutes. Subsequently, 15 parts of xylene and 2 parts of t-butylperoxy-2-ethylhexanoate were added dropwise for 30 minutes, and stirring was continued for further 1 hours. After evaporation the 113 parts of the solvent under reduced pressure to yield acrylic resin varnish (b-5) having acid anhydride, which had the non-volatile content of 70% and the number average molecular weight of 2,300.

Synthesis 17: Preparation of half esterified resin (B-5)

154 Parts by weight of the polymer varnish (b-5) obtained in Synthesis 16 was admixed with 8.6 parts by weight of methanol, and the mixture was reacted at 65° C. for 24 hours to obtain half-esterified resin (B-5). Resin (B-5) was subjected to infrared absorption spectrometry to confirm the absence of the absorption of acid anhydrides (1785 $cm^{-1}$).

Synthesis 18: Synthesis of resin (C-3) containing epoxy groups and hydroxyl groups In a reaction tank fitted with a thermometer, stirrer, condenser, nitrogen inlet and drip funnel, 123 parts by weight of xylene was placed and the mixture was heated to 130° C. To this tank, using a drip funnel, 23 parts by weight of styrene monomer, 38 parts by weight of glycidyl methacrylate, 24 parts by weight of 4-hydroxybutyl acrylate, 15 parts by weight of 2-ethylhexyl acrylate and 12 parts by weight of t-butylperoxy 2-ethylhexanoate were added dropwise over 3 hours.

After completion of the addition, the mixture was kept at 130° C. for 30 minutes, and then the solution consisting of 1 part by weight of t-butylperoxy 2-ethylhexanoate and 20 parts by weight of xylene was added dropwise over 30 minutes. After completion of the addition, the reaction was further proceeded at 130° C. for 1 hour and 107 parts of the solvent was evaporated off under reduced pressure to obtain acryl resin varnish (C-3) having the non-volatile content of 70% and number average molecular weight of 2,000, epoxy equivalent of 375 and hydroxyl equivalent of 591.

Synthesis 19: Synthesis of resin (C-4) having epoxy groups and hydroxyl groups

As described in Synthesis 18, an acrylic resin (C-4) having an epoxy equivalent of 375, a hydroxyl equivalent of 880 and a number average molecular weight of 2,000 was obtained, using 12 parts by weight of styrene, 38 parts by weight of glycidyl methacrylate, 50 parts by weight of Blemmer PE-350 (polyethylene oxide type monomer in n=9 in formula (I) available from Nippon Oil & Fats Co., Ltd.) and 12 parts by weight of t-butylperoxy 2-ethylhexanoate.

E-3: Cymel 327: Methylated melamine (Mitsui Cyanamide) was used.

E-4: Cymel 254: Methyl-butyl mixed alkylated melamine (Mitsui Cyanamide) was used.

Example of dispersion

The premix base shown below was placed in a 2 L vessel, and dispersed using a tabletop sand mill at 2000 rpm for 3 hours.

White pigment (CR-97) paste used in Examples was prepared by mixing the following components.

| Component | Parts by weight |
| --- | --- |
| CR-97 | 600 |
| D-2 resin varnish | 185 |
| D-1 resin varnish | 200 |
| Xylene | 8 |
| Butyl acetate | 8 |

Red pigment (Irgagine red DDR-BO) paste used in Examples was prepared by mixing the following components.

| Irgagine red DPP-80 | 144 |
| --- | --- |
| D-2 resin varnish | 111 |
| D-1 resin varnish | 205.8 |
| Xylene | 69.6 |
| Butyl acetate | 69.6 |

Black pigment (PW-200P) paste used in Examples was prepared by mixing the following components.

| FW-200P | 40.5 |
| --- | --- |
| D-3 resin varnish | 104.0 |
| D-1 resin varnish | 230.9 |
| Xylene | 112.1 |
| Butyl acetate | 112.1 |

Examples 15 to 23 and Comparative Examples 9 to 13

Using respective pigment pastes corresponding to the pigment dispersion resins, the coating compositions having the solid content shown in Table 5 were formulated.

Coating examples

To a dull steel plate treated with zinc phosphate having the thickness of 0.8 mm, cation electrodeposition coating (Nippon Paint, Powertop pu-50) was deposited electrically to have the dry thickness of about 25 µm.

To the electrodeposited coating thus obtained, inter-mediate coating composition (Nippon Paint, Orga P-2 Sealer) was air-sprayed to have the dry thickness of about 40 µm, and then cured at 140° C. for 30 minutes. Subsequently, the coating compositions having the solid contents shown in Table 5 were formulated and adjusted to have the viscosity of 30 seconds when determined with Ford cup No.4. The compositions thus formulated were applied with the air-spray to have the dry thickness of about 40 µm. After setting for about 7 minutes, the coating was cured at 140° C. for 30 minutes. The acid resistance and the mar resistance of the coating were evaluated as described below.

Comparative Examples

High solid alkyd/melamine type coating was applied on the intermediate coating

White coating; NV 59.1%, alkyd resin/melamine resin=6/4, pwc=40%

Red coating; NV 58.4%, alkyd resin/melamine resin=6/4, pwc=10%

Evaluation method of the coating film

1) Acid resistance

1% by weight solution of sulfuric acid was kept at 60° C. and the test pieces were immersed in this solution for 24 hours. Then the test pieces were taken out and evaluated for the gloss retention of 60° as follows.

Gloss retention

◉: 90 or higher

○: 70 or higher and less than 90

Δ: 40 or higher and less than 70

×: less than 40

2) Mar resistance

A cleanser (Kaneyo) was applied to a two-folded flannel fabric in the amount of about 1 cc, and the fabric was mounted on reciprocating head of the friction resistance tester of Gakushin type. With a loading of 700 g, the head was moved reciprocally 10 times, and then the 20° gloss of the tested portion was determined to obtain the gloss retention. The evaluation was conducted as described in section 1) above. Compositions and the results of the evaluation are shown in Table 5.

TABLE 5

| | Example | | | | | | | | | Comparative | | | | | | |
|---|---|---|---|---|---|---|---|---|---|---|---|---|---|---|---|---|
| | 15 | 16 | 17 | 18 | 19 | 20 | 21 | 22 | 23 | 9 | 10 | 11 | 12 | 13 | | |
| I-1 | 10.0 | | 6.0 | 12.0 | 10.0 | 18.0 | 18.0 | 19.4 | | 3.0 | | 5.4 | 5.8 | | Current | Current |
| I-2 | | 10.0 | | | | | | | 24.3 | | | | | | melamine based | melamine based |
| B-5 | 7.4 | 9.2 | 6.0 | 8.9 | 7.4 | 9.0 | 9.0 | 10.0 | 10.0 | 2.2 | 16.3 | 2.5 | 2.7 | 26.4 | white paint | red paint |
| C-3 | 12.6 | | 6.0 | 15.1 | 12.6 | 18.0 | 18.0 | 19.1 | 14.2 | 3.8 | 13.7 | 5.6 | 6.0 | 22.1 | | |
| C-4 | | 10.8 | | | | | | | | | | | | | | |
| D-1 | 5.0 | 5.0 | 7.0 | 4.0 | 5.0 | 17.5 | 22.0 | 24.1 | 24.1 | 8.5 | 5.0 | 29.8 | 41.0 | 24.1 | | |
| D-2 | 10.0 | 10.0 | 14.0 | 8.0 | 10.0 | 5.0 | 5.0 | | | 17.0 | 10.0 | 8.5 | | | | |
| D-3 | | | | | | | | 5.0 | 5.0 | | | | 8.5 | 5.0 | | |
| E-3 | 15.0 | 15.0 | 21.0 | 12.0 | | 22.5 | 18.0 | 19.4 | 19.4 | 25.5 | 15.0 | 38.3 | 33.0 | 19.4 | | |
| E-4 | | | | | 15.0 | | | | | | | | | | | |
| F-1 | 40.0 | 40.0 | 40.0 | 40.0 | 40.0 | | | | | 40.0 | 40.0 | | | | | |
| F-2 | | | | | | 10.0 | 10.0 | | | | | 10.0 | | | | |
| F-3 | | | | | | | | 3.0 | 3.0 | | | | 3.0 | 3.0 | | |
| G | 0.3 | 0.3 | 0.3 | 0.3 | 0.3 | 0.5 | 0.5 | 0.5 | 0.5 | 0.3 | 0.3 | 0.5 | 0.5 | 0.5 | | |
| H | 0.1 | 0.1 | 0.1 | 0.1 | 0.1 | 0.1 | 0.1 | 0.1 | 0.1 | 0.1 | 0.1 | 0.1 | 0.1 | 0.1 | | |
| Acid resistance | ◉ | ◉ | ○ | ◉ | ◉ | ◉ | ◉ | ◉ | ◉ | Δ | ◉ | Δ | Δ | ◉ | × | × |
| Mar resistance | ◉ | ◉ | ◉ | ◉ | ◉ | ◉ | ◉ | ○ | ○ | ○ | ○ | ○ | ○ | ○ | ○ | Δ |
| solid content (wt) | 60.1 | 60.5 | 59.8 | 60.6 | 59.6 | 59.5 | 59.3 | 58.0 | 57.9 | 59.4 | 51.5 | 58.5 | 57.9 | 49.5 | 59.1 | 58.4 |

In Table 5, the current melamine based red paint is the same as described in Table 3, and the current melamine based white paint was prepared from the following ingredients.

In Table 3, the current melamine-based red paint in Comparative Example 6 had the following formulation.

| Ingredients | Parts by weight |
|---|---|
| Titan CR-97 (white pigment) | 33.0 |
| Polyester resin*[1] | 2.0 |
| Alkyd resin*[2] | 2.0 |
| Uban 128*[3] | 10.0 |
| Disperon KS-281*[4] | 0.2 |
| n-Butanol | 9.0 |
| S-100 | 17.0 |

*[1] A polyester resin having an acid value of 5, a hydroxyl value of 80, a number average molecular weight of 3,380 and a weight average molecular weight of 27,200, available from Nippon Paint Co., Ltd.
*[2] An alkyd resin having an oil length of 20 (coconut oil), an acid value of 8, a hydroxyl value of 110, a number average molecular weight 2,700 and weight average molecular weight of 16,000, available from Nippon Paint Co., Ltd.
*[3] A melamine resin available from Mitsui-Toatsu Co., Ltd.
*[4] A surface conditioner available from Kusumoto Kasei Co., Ltd.

We claim:

1. A color coating composition comprising:

(1) 10 to 60% by weight of one or more pigment dispersing resins selected from the group consisting of a polyester resin and derivatives thereof which are modified with a basic substance, wherein said resin has an acid value from 5 to 300 mgKOH/g(solid), a hydroxyl value from 5 to 300 mgKOH/g(solid), a number average molecular weight from 400 to 6,000, said polyester resin is prepared from acid component and alcohol component and said acid component contains not more than 25% by weight of an acid having a straight carbon chain with 12 or more carbon atoms based on the total monomer weight of the polyester resin;

(2) 1 to 40% by weight of an aminoplast;

(3) 5 to 60% by weight of a polymer having carboxyl groups and carboxylic ester groups, which is obtained by reacting (i) an acid anhydride-containing polymer obtained by copolymerizing (a) 15 to 40% by weight of an acid anhydride-containing ethylenically unsaturated monomer with (b) 60 to 85 by% weight of other copolymerizable ethylenically unsaturated monomer, with (ii) a hydroxyl group-containing compound having 1 to 12 carbon atoms in the molar ratio of the acid anhydride/the hydroxyl group of 1/10 to 1/1;

(4) 5 to 60% by weight of a polymer having hydroxyl groups and epoxy groups obtained by copolymerizing (i) 5 to 70% by weight of a hydroxyl group-containing ethylenically unsaturated monomer having the structure of the formula (i):

wherein R represents hydrogen or methyl group, X represents

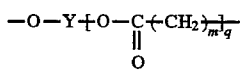

(Y is a straight or branched alkylene group having 2 to 8 carbon atoms, m is an integer from 3 to 7, and q is an integer from 0 to 4) or

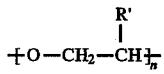

(R' represents hydrogen or methyl group and n is an integer of 2 to 50), (ii) 10 to 60% by weight of an epoxy group-containing ethylenically unsaturated monomer, and optionally (iii) 0 to 85% by weight of other copolymerizable ethylenically unsaturated monomer, and, (5) a pigment, and, (8) a catalyst being a combination of a quaternary ammonium salt and a tin-containing compound, wherein a content of the quaternary ammonium salt is 0.1 to 2.0% by weight based on the solid content the resin composition, a content of the tin-containing compound is 0.05 to 6.0% by weight based on the solid content the resin composition and a weight ratio of the ammonium salt and the tin containing compound is ¼ to 1/0.2, wherein the contents of the components (1) to (4) are based on the resin solid component in the composition, while the contents of the monomers in the components (3) and (4) are based on the total monomers of the respective components, a Weight ratio of pigment/resin solid in the composition is from 0.01/1 to 1/1 and the pigment (5) is formulated in the resin composition after it is mixed with the pigment dispersions resin to form a pigment paste.

2. A composition according to claim 1 wherein the basic substance used to modify the polyester resin is aminoplast, hydroxyethylethylene imine or 2-hydroxy-propyl-2-aziridinylethyl carboxylate.

3. A composition according to claim 1 wherein the aminoplast (2) is a modified melamine.

4. A composition according to claim 1 wherein the polymer (3) has a number average molecular weight of 1,500 to 8,000 and an acid value of 30 to 250 mgKOH/g (solid).

5. A composition according to claim 1 wherein the acid anhydride-containing ethylenically unsaturated monomer (3) (i) (a) is selected from the group consisting of itaconic anhydride, maleic anhydride, citraconic anhydride, and the mixture thereof.

6. A composition according to claim 1 wherein the hydroxy group-containing compound (3)(ii) is a monohydric alcohol having 1 to 12 carbon atoms.

7. A composition according to claim 6 wherein the monohydric alcohol is selected from the group consisting of hydroxy-2-propanone, allyl alcohol, furfuryl alcohol, propargyl alcohol and methanol.

8. A composition according to claim 1 wherein the polymer (4) has a number average molecular weight from 500 to 8,000.

9. A composition according to claim 8 wherein the polymer (4) has average at least two epoxy groups in one molecule, an epoxy equivalent of 100 to 800, a hydroxyl equivalent of 200 to 1,200.

10. A color coating composition comprising:

(1) 10 to 80% by weight of one or more pigment dispersing resins selected from the group consisting of a polyester resin and derivatives thereof which are modified with a basic substance, wherein said resin has an acid value from 5 to 300 mgKOH/g(solid), a hydroxyl value from 5 to 300 mgKOH/g(solid), a number average molecular weight from 400 to 8,000, said polyester resin is prepared from acid component and alcohol component and said acid component contains not more than 25% by weight of an acid having a straight carbon chain with 12 or more carbon atoms based on the total monomer weight of the polyester resin;

(2) 1 to 40% by weight of an aminoplast;

(3) 5 to 60% by weight of a polymer having carboxyl groups and carboxylic ester groups, which is obtained by reacting (i) an acid anhydride-containing polymer obtained by copolymerizing (a) 15 to 40% by weight of an acid anhydride-containing ethylenically unsaturated monomer with (b) 60 to 85% by weight of other copolymerizable ethylenically unsaturated monomer, with (ii) a hydroxyl group-containing compound having 1 to 12 carbon atoms in the molar ratio of the acid anhydride/the hydroxyl group of 1/10 to 1/1;

(4) 5 to 60% by weight of a polymer having hydroxyl groups and epoxy groups obtained by copolymerizing (i) 5 to 70% by weight of a hydroxyl group-containing ethylenically unsaturated monomer having the structure of the formula (i):

wherein R represents hydrogen or methyl group, X represents

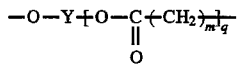

(Y is a straight or branched alkylene group having 2 to 8 carbon atoms, m is an integer from 3 to 7, and q is an integer from 0 to 4) or

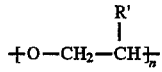

(R' represents hydrogen or methyl group and n is an integer of 2 to 50), (ii) 10 to 60% by weight of an epoxy group-containing ethylenically unsaturated monomer, and optionally (iii) 0 to 85% by weight of other copolymerizable ethylenically unsaturated monomer, (5) a pigment, and (6) an acrylic resin having hydroxyl groups and carboxyl groups, wherein the contents of the components (1) to (4) are based on the resin solid component in the composition, while the contents of the monomers in the components (3) and (4) are based on the total monomers of the respective components, and (8) a catalyst being a combination of a quaternary ammonium salt and a tin-containing compound, wherein a content of the quaternary ammonium salt is 0.1 to 2.0% by weight based on the solid content the resin composition, a content of the tin-containing compound is 0.05 to 6.0% by weight based on the solid content the resin composition and a weight ratio of the ammonium salt and the tin containing compound is ¼ to 1/0.2, a weight ratio of pigment/resin solid in the composition is from 0.01/1 to 1/1 and the pigment (5) is formulated in the resin composition after it is mixed with the pigment dispersions resin to form a pigment paste.

11. A composition according to claim 10 wherein the basic substance used to modify the polyester resin is aminoplast, hydroxyethylethylene imine or 2-hydroxy-propyl-2-aziridinylethyl carboxylate.

12. A composition according to claim 10 wherein the aminoplast (2) is a modified melamine.

13. A composition according to claim 10 wherein the polymer (3) has a number average molecular weight of 1,500 to 8,000 and an acid value of 30 to 250 mgKOH/g (solid).

14. A composition according to claim 10 wherein the acid anhydride-containing ethylenically unsaturated monomer (3) (i) (a) is selected from the group consisting of itaconic anhydride, maleic anhydride, citraconic anhydride, and the mixture thereof.

15. A composition according to claim 10 wherein the hydroxy group-containing compound (3)(ii) is a monohydric alcohol having 1 to 12 carbon atoms.

16. A composition according to claim 15 wherein the monohydric alcohol is selected from the group consisting of hydroxy-2-propanone, allyl alcohol, furfuryl alcohol, propargyl alcohol and methanol.

17. A composition according to claim 10 wherein the polymer (4) has a number average molecular weight from 500 to 8,000.

18. A composition according to claim 17 wherein the polymer (4) has average at least two epoxy groups in one molecule, an epoxy equivalent of 100 to 800, a hydroxyl equivalent of 200 to 1,200.

19. A composition according to claim 10 wherein the acrylic resin (6) is obtained by copolymerizing (i) 20 to 100% by weight of a mixture of a carboxyl group-containing ethylenically unsaturated monomer and a hydroxyl group-containing ethylenically unsaturated monomer, obtained by reacting the hydroxyl group-containing ethylenically unsaturated monomer (I) used in the component (4) with an anhydride-containing compound in the molar ratio of hydroxyl group/acid anhydride group of 1/0.9 to 1/0.5, and optionally (ii) 0 to 80% by weight of other copolymerizable ethylenically unsaturated monomers.

20. A color coating composition comprising:
(1) 10 to 60% by weight of one or more pigment dispersing resins selected from the group consisting of a polyester resin and derivatives thereof which are modified with a basic substance, wherein said resin has an acid value from 5 to 300 mgKOH/g(solid), a hydroxyl value from 5 to 300 mgKOH/g(solid), a number average molecular weight from 400 to 6,000, said polyester resin is prepared from acid component and alcohol component and said acid component contains not more than 25% by weight of an acid having a straight carbon chain with 12 or more carbon atoms based on the total monomer weight of the polyester resin;
(2) 1 to 40% by weight of an aminoplast;
(3) 5 to 60% by weight of a polymer having carboxyl groups and carboxylic ester groups, which is obtained by reacting (i) an acid anhydride-containing polymer obtained by copolymerizing (a) 15 to 40% by weight of an acid anhydride-containing ethylenically unsaturated monomer with (b) 60 to 85% by weight of other copolymerizable ethylenically unsaturated monomer, with (ii) a hydroxyl group-containing compound having 1 to 12 carbon atoms in the molar ratio of the acid anhydride/the hydroxyl group of 1/10 to 1/1;
(4) 5 to 60% by weight of a polymer having hydroxyl groups and epoxy groups obtained by copolymerizing (i) 5 to 70% by weight of a hydroxyl group-containing ethylenically unsaturated monomer having the structure of the formula (i):

wherein R represents hydrogen or methyl group, X represents

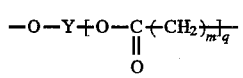

(Y is a straight or branched alkylene group having 2 to 8 carbon atoms, m is an integer from 3 to 7, and q is an integer from 0 to 4) or

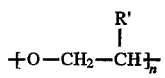

(R' represents hydrogen or methyl group and n is an integer of 2 to 50), (ii) 10 to 60 % by weight of an epoxy group-containing ethylenically unsaturated monomer, and optionally (iii) 0 to 85 % by weight of other copolymerizable ethylenically unsaturated monomer, (5) a pigment, and (7) a silicone polymer having hydroxyl groups and carboxyl groups obtained by half esterification of (i) a hydroxyl group-containing silicone polymer having on the average 3 to 12 hydroxyl groups in a molecule which is at least one selected from the group consisting of the compounds having the structure:

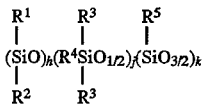

wherein $R^1$ is methyl, phenyl or phenylethyl group, $R^2$ and $R^3$ are independently methyl, phenyl, phenylethyl, 3-hydroxy- propyl or 3-(hydroxyethoxy)propyl group, $R^4$ is methyl, 3-hydroxypropyl or 3-(hydroxyethoxy) propyl group, $R^5$ is methyl, phenyl, phenylethyl or isobutyl group provided that at least one of $R^2$, $R^3$ and $R^4$ represents 3-hydroxypropyl or 3-(hydroxyethoxy) propyl group, h is an integer from 1 to 20, j is an integer from 2 to 4, k is an integer from 0 to 2, and the order of each of the bracketed groups h, j and k is interchangeable and is not limited to that represented, and (ii) an acid anhydride-containing compound, in a ratio of hydroxyl group/acid anhydride group of 1/1.0 to 110.2, wherein the contents of the components (1) to (4) are based on the resin solid component in the composition, while the contents of the monomers in the components (3) and (4) are based on the total monomers of the respective components;

(8) a catalyst being a combination of a quaternary ammonium salt and a tin-containing compound, wherein a content of the quaternary ammonium salt is 0.1 to 2.0% by weight based on the solid content the resin composition, a content of the tin-containing compound is 0.05 to 6.0% by weight based on the solid content the resin composition and a weight ratio of the ammonium salt and the tin containing compound is 1/4 to 1/0.2, a weight ratio of pigment/resin solid in the composition is from 0.01/1 to 1/1 and the pigment (5) is formulated in the resin composition after it is mixed with the pigment dispersions resin to form a pigment paste.

21. A composition according to claim 20 wherein the basic substance used to modify the polyester resin is aminoplast, hydroxyethylethylene imine or 2-hydroxypropyl-2-aziridinylethyl carboxylate.

22. A composition according to claim 20 wherein the aminoplast curing agent (2) is a modified melamine.

23. A composition according to claim 20 wherein the polymer (3) has a number average molecular weight of 1,500 to 8,000 and an acid value of 30 to 250 mgKOH/g (solid).

24. A composition according to claim 20 wherein the acid anhydride-containing ethylenically unsaturated monomer (3) (i) (a) is selected from the group consisting of itaconic anhydride, maleic anhydride, citraconic anhydride, and the mixture thereof.

25. A composition according to claim 20 wherein the hydroxy group-containing compound (3)(ii) is a monohydric alcohol having 1 to 12 carbon atoms.

26. A composition according to claim 25 wherein the monohydric alcohol is selected from the group consisting of hydroxy-2-propanone, allyl alcohol, furfuryl alcohol, propargyl alcohol and methanol.

27. A composition according to claim 20 wherein the polymer (4) has a number average molecular weight from 500 to 8,000.

28. A composition according to claim 27 wherein the polymer (4) has average at least two epoxy groups in one molecule, an epoxy equivalent of 100 to 800, a hydroxyl equivalent of 200 to 1,200.

29. A composition according to claim 20 wherein the silicone polymer (7) has a molecular weight from 500 to 6,000.

30. A composition according to claim 20 wherein the silicone polymer (7) has an acid value from 20 to 180 mgKOH/g(solid) and a hydroxyl value from 2 to 120.

* * * * *